United States Patent
Singh

(10) Patent No.: US 12,229,897 B2
(45) Date of Patent: Feb. 18, 2025

(54) INTELLIGENT DYNAMIC RENDERING OF AUGMENTED REALITY ENVIRONMENT

(71) Applicant: Bank of America Corporation, Charlotte, NC (US)

(72) Inventor: Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 37 days.

(21) Appl. No.: 17/691,203

(22) Filed: Mar. 10, 2022

(65) Prior Publication Data

US 2023/0290076 A1 Sep. 14, 2023

(51) Int. Cl.
| | |
|---|---|
| G06T 19/00 | (2011.01) |
| G06V 10/764 | (2022.01) |
| G06V 20/20 | (2022.01) |
| H04W 4/80 | (2018.01) |

(52) U.S. Cl.
CPC .......... G06T 19/006 (2013.01); G06V 10/764 (2022.01); G06V 20/20 (2022.01); H04W 4/80 (2018.02)

(58) Field of Classification Search
CPC .... G06T 19/006; G06V 10/764; G06V 20/20; G06V 10/82; G06V 20/70; H04W 4/02; H04W 4/021; H04W 4/80
See application file for complete search history.

(56) References Cited

U.S. PATENT DOCUMENTS

| | | | | |
|---|---|---|---|---|
| 9,654,222 | B1* | 5/2017 | Shatz | H04B 10/697 |
| 11,250,642 | B1* | 2/2022 | Gordon | G06T 19/006 |
| 11,461,408 | B1* | 10/2022 | Bhushan | G06F 16/9038 |
| 11,876,941 | B1* | 1/2024 | Suiter | G06F 40/169 |
| 2015/0109338 | A1* | 4/2015 | McKinnon | G06F 16/58 |
| | | | | 345/633 |
| 2021/0209676 | A1* | 7/2021 | Deol | G02B 27/0093 |
| 2022/0139049 | A1* | 5/2022 | Stephen | G06Q 10/103 |
| | | | | 345/633 |

(Continued)

FOREIGN PATENT DOCUMENTS

| | | | | |
|---|---|---|---|---|
| JP | 2020062370 A | * | 4/2020 | .......... A63F 13/213 |
| KR | 20230127708 A | * | 9/2023 | |

OTHER PUBLICATIONS

"What are recurrent neural networks", https://www.ibm.com/topics/recurrent-neural-networks, retrieved Jun. 15, 2023 (Year: 2023).*

*Primary Examiner* — Chante E Harrison
(74) *Attorney, Agent, or Firm* — Weiss & Arons LLP

(57) ABSTRACT

Systems, methods, and apparatus are provided for intelligent dynamic rendering of an augmented reality (AR) display. An AR device may capture an image of a physical environment. Feature extraction combined with deep learning may be used for object recognition and detection of changes in the environment. Contextual analysis of the environment based on the deep learning outputs may enable improved integration of AR rendering with the physical environment in real time. A BLE beacon feed may provide supplemental information regarding the physical environment. The beacon feed may be extracted, classified, and labeled based on user interests using machine learning algorithms. The beacon feed may be paired with the AR advice to incorporate customized location-based graphics and text into the AR display.

13 Claims, 10 Drawing Sheets

(56) References Cited

U.S. PATENT DOCUMENTS

2022/0358727 A1* 11/2022 Gupta .................. G06T 19/006
2023/0107590 A1* 4/2023 Kreiner .................. G06T 11/00
345/633

* cited by examiner

INTELLIGENT DYNAMIC RENDERING OF AUGMENTED REALITY ENVIRONMENT

FIELD OF TECHNOLOGY

Aspects of the disclosure relate to integration of an augmented reality display with the physical environment.

BACKGROUND OF THE DISCLOSURE

Augmented reality (AR) may enhance customer interactions in a range of ways. Using AR, a view of a physical environment may be enhanced with overlaid text and graphics.

AR presents a range of technical challenges. The user device should understand the physical environment, generate the appropriate overlay, and seamlessly integrate the two. The integration should be rendered dynamically to adapt to changes in user position and changes in the environment.

It would be desirable to provide improved methods for rendering an AR display that is integrated with a real time view of the physical environment. It would further be desirable to customize the rendered AR display for the individual needs and preferences of a device user.

SUMMARY OF THE DISCLOSURE

Systems, methods, and apparatus for rendering an integrated augmented environment are provided.

A beacon device may transmit a signal that includes a location-related message. The signal may be received at an AR device. The beacon signal may be extracted and classified based on a user interest.

The AR device may capture a view of a physical environment. Using one or more deep learning algorithms to identify objects and detect changes in the environment, the AR device may dynamically map the physical environment.

Based on the parsed beacon message and the dynamic mapping, a rendering engine may generate an AR display that integrates rendered graphics and text with the view of the physical environment.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
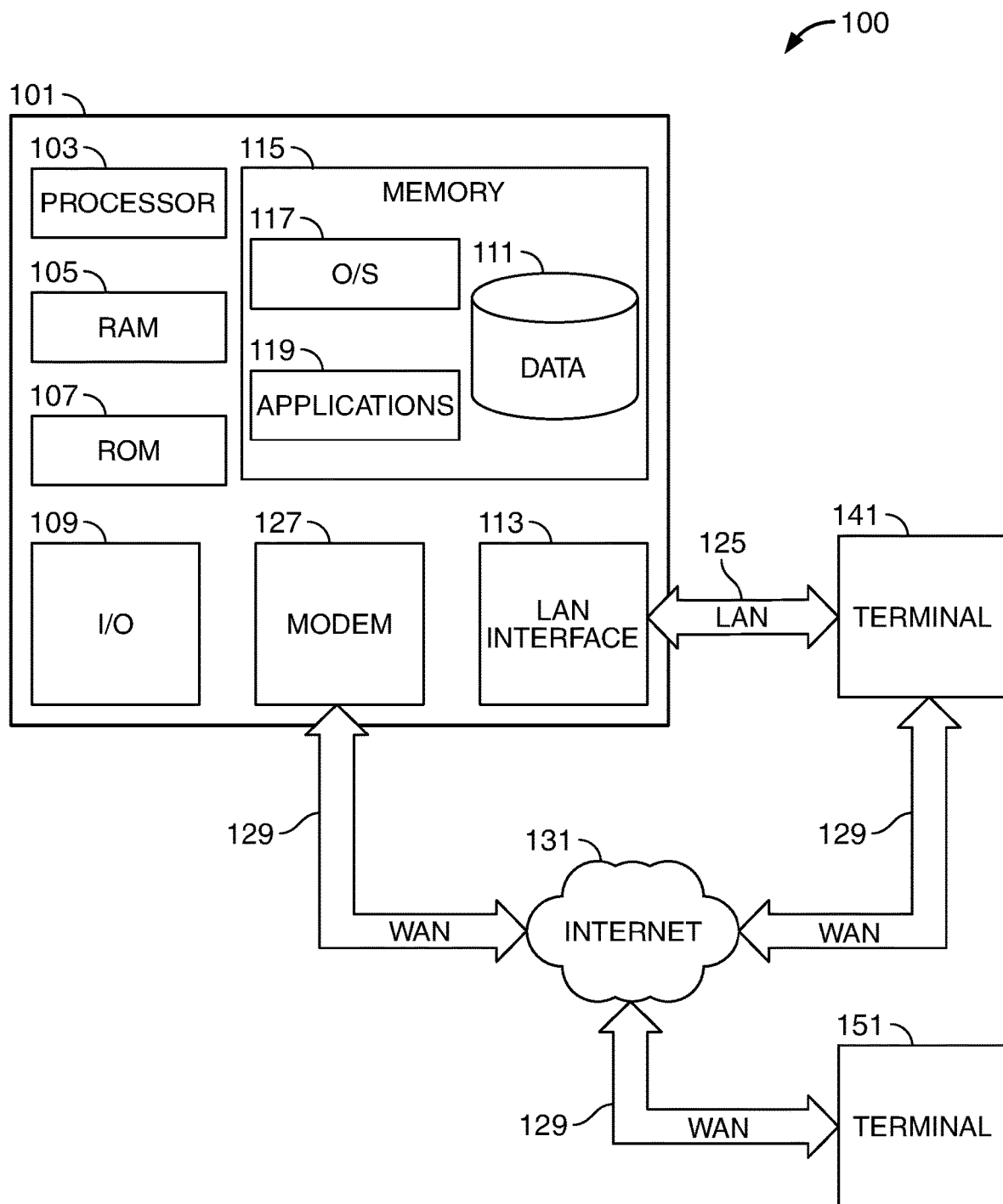
FIG. 1 shows illustrative apparatus in accordance with principles of the disclosure.

Systems, methods, and apparatus for intelligent dynamic rendering of an augmented reality environment are provided.

The quality of an AR rendering may be improved using deep learning to understand context within the physical environment and dynamically identify changes. Incorporation of input from a beacon feed may provide supplemental information regarding the physical environment and may be filtered based on user interests and preferences. The customized AR display may be rendered in real time for a dynamic integrated view of the augmented environment.

For the sake of illustration, the invention will be described as being performed by a "system." The system may include one or more features of apparatus and methods that are described herein and/or any other suitable device or approach.

AR typically involves a display of data that is overlaid on a view of real-world objects. The display may be viewed on a mobile device, smart glasses lenses, smart contact lenses, or on any suitable medium.

An AR device may include one or more displays. For example, in a smart glasses device, a display controller may be configured to display data as a semi-transparent overlay appearing on the lenses. AR displays may be achieved through curved mirror techniques, waveguide-based technology, or via any suitable method.

An AR device may include one or more communication transceivers. The communication transceivers may be operable to communicate with an external processor. The external processor may be located within a mobile device, an edge gateway, a cloud-based server, or any other suitable computing device.

An AR device may include a nano wireless network interface card ("NIC"). The nano wireless NIC may provide the smart glasses with a dedicated, full-time connection to a wireless network. The nano wireless NIC may implement the physical layer circuitry necessary for communicating with a data link layer standard, such as Wi-Fi. The nano wireless NIC may support input/output ("I/O"), interrupt, direct memory access, interfaces, data transmission, network traffic engineering and/or partitioning.

An AR device may include a wireless controller application. The wireless controller application may be configured to interface between the NIC and an external Wi-Fi device. The wireless controller application may be configured to transmit data collected by the AR device over the wireless network.

An AR device may include an active near field communication ("NFC") reader configured to establish contactless communication with another device located within a predetermined proximity.

An AR device may include an embedded subscriber identification module ("E-SIM") card. The E-SIM may enable the smart glasses to communicate and share data with another pair of smart glasses. An AR device may include one or more wired and/or wireless communication applications such as Bluetooth™. An AR device may utilize cellular technology or Wi-Fi to be operable as wearable computers running self-contained mobile applications. In some embodiments, an AR device may use LoRa™ or any suitable low power communication technology.

An AR device may include one or more cameras for capturing images and/or videos, one or more audio input devices, and one or more audio output devices.

AR device inputs from a user may be hands-on. AR device inputs from a user may be hands-free. In some embodiments, AR device inputs may involve a combination of hands-on and hands-free protocols.

In some embodiments, AR device inputs may be hands-on. For example, smart glasses may require the use of touch buttons on the frame. In some embodiments, the user input may also be entered via a nano touch screen incorporated into the frame or lenses of the smart glasses. Touch-based gestures may include swiping, tapping, squeezing and any other suitable touch-based gestures or combination of touch-based gestures.

In some embodiments, AR device inputs may be hands-free. For example, smart glasses may receive hands-free input through voice commands, gesture recognition, eye tracking or any other suitable method. Gesture recognition may include air-based hand and/or body gestures. Air-based gestures may be performed without touching the smart glasses.

An AR device may include one or more sensors. Illustrative sensors may include a touch screen, camera, accelerometer, gyroscope and any other suitable sensors. The AR device sensors may detect hands-free input such as air gestures or eye movement.

The system may include an AR rendering engine. One stream of input to the AR rendering engine may be based on user location. The location may be identified using GPS technology.

In some embodiments, the location may be identified based on object recognition. For example, the system may identify a banking logo and understand that the location is a banking center, or a banking center affiliated with a particular enterprise. An image may be captured by a camera associated with the AR device. The system may use any suitable deep learning algorithms for image analysis. Illustrative algorithms for image recognition include generative adversarial networks (GANs) and recurrent convolutional neural networks (RCNNs). Object recognition may also use recurrent neural networks (RNNs) such as long short-term memory (LSTM) networks.

In some embodiments, supplemental location information may be extracted from a beacon signal. The system may receive a feed from a beacon. The beacon may be a Bluetooth low energy (BLE) beacon. The beacon may be configured to continually project information to devices within a predetermined radius. The beacon may transmit information at predetermined intervals. The beacon may transmit a single message or a set of different messages. The beacon may transmit information about the location. For example, the beacon message may include information about a product or service available at the location.

Location information from GPS, object recognition, and/or beacon transmissions may be filtered based on user interests to suggest information that will be beneficial to the user. The suggestions may be in the form of text and/or objects integrated into the AR display. Machine learning algorithms may identify products or services that are associated with the location and may be of interest to the user. For example, user search history may indicate that the user has an interest in securing a safety deposit box. The AR device may receive data associated with user interests or past user conduct from a user device or from any suitable source.

In some embodiments, the system may enable the user to record interests or preferences. The location information may be filtered based on recorded user preferences. In some embodiments, the system may enable the user to select from a set of categories of interest. The user may also obtain a customized experience by selecting parameters for the augmented display. For example, selecting options may enable the user to adjust the sizing, frequency, composition, and/or color scheme as well as any other suitable parameters.

The system may generate an AR display based on the location data and the user interest. For example, location data may indicate a banking center and user interest may in include a safety deposit box. In response to the location data, the system may generate an AR display showing availability of a safety deposit box. The display may include a graphic image of the safety deposit box. The display may include text indicating the availability of a safety deposit box at the banking center location. The display may include an interactive link to an application for a safety deposit box. The display may include instructions for navigating to a counter in the banking center building. The display may include a name and contact information for a banking center representative.

The system may include a pairing and orchestration engine for pairing the beacon device with an AR rendering engine. The pairing engine may use natural language processing (NLP) to extract messages from the beacon feed. The pairing engine may use machine learning to classify the message. The engine may use any suitable classification algorithm. Illustrative classification algorithms include random forest algorithms, logistic regression algorithms, support vector machine algorithms and decision tree algorithms. The engine may use machine learning algorithms to label the message based on user interests. The labeled messages may be input into the AR rendering engine.

Another stream of input to the rendering engine may include object data from the physical environment. An AR device camera may capture views of the physical environment. Images may be captured at predetermined intervals. Images may be captured in response to detection of a change in the environment.

The system may include a feature extraction engine. The feature extraction engine may perform image analysis. The feature extraction engine may include a GAN. The feature extraction engine may include an RNN using LSTM. The feature extraction engine may include NLP for parsing text within the image.

The system may include an event monitoring engine. The AR camera may capture a series of views at different timestamps. The event monitoring engine may identify changes in the physical environment. The event monitoring engine may access the deep learning models.

The system may include a contextual analysis engine. The contextual analysis engine may determine placement of identified objects in relation to their environment. The engine may extract properties of the physical environment. The engine may extract spatial properties of the environment. The engine may measure dimensions of objects and their distances from each other. The engine may establish alignments of objects within the environment. The engine may establish other properties of the environment such as the volume of traffic. For example, if a banking center is very crowded, instructions within the AR display may direct the user to a particular counter or representative.

The system may include an AR rendering engine. The engine may receive input from the beacon pairing module. The engine may receive properties of the physical environment from the contextual analysis engine. The engine may render virtual objects based on the classified and labeled beacon messages and the properties of the physical environment. The engine may render spatial frames that integrate rendered graphics and text with the views captured by the camera.

In some embodiments, an image of the physical environment may be overlaid with rendered graphics or text. In some embodiments an image of the physical environment may be rendered and integrated with the graphics and text into a single spatial frame.

The AR display may include graphics and/or text. The rendered graphics may be two dimensional or three dimensional. The rendered images may include features that coordinate with the environment. For example, a surface of a rendered object may match the color and texture of other surfaces in the environment.

The AR graphics and/or text may be rendered around detected objects in the environment. A set of rules may guide placement of the AR graphics and/or text. For example, rules may prohibit placing a rendered object over a door or window. Rules may prohibit placing a rendered object on a ceiling or floor. Instead, the rendered graphics or text may be displayed on a blank wall, counter, or other suitable location. Deep learning based object recognition may enable the system to identify objects within the physical environment and integrate the rendered objects into an improved AR display.

AR graphics and/or text may be adjusted in response to user movement through the environment. The AR device camera may capture images at different user vantage points. The position or perspective of the rendered graphics and/or text may be adjusted to correspond to each new vantage point. The AR device camera may capture movement or entities within the physical environment. The position or perspective of the rendered graphics and/or text may be adjusted to correspond to changes in the environment.

The AR rendering engine may provide feedback to the deep learning algorithms for ongoing model training.

The system may process captured images at the AR device to reduce latency. Reduced latency may enable real-time identification of changes in the environment and concomitant adjustments to the AR display. For example, as the user moves through the physical environment, the view through the AR device may change and placement of rendered objects may be adjusted.

In some embodiments, processing may be shared between the AR rendering engine at the AR device and another device such as a mobile device. For example, if the AR device is a wearable device with a limited storage capacity and/or limited processing capability, processing may be shared with a mobile phone application.

Processing may be shared between the AR device and an edge gateway or other devices on a local edge network. The AR device may scan a local edge network for the nearest edge device with rendering capabilities.

Processing may be shared between the AR device and a remote location such as cloud-based infrastructure. The AR device may communicate on a 5G or 6G network which are capable of faster transmission than conventional networks. The faster networks may enable live data stream rendering from cloud-based rendering platforms.

The system may be compatible with a range of AR devices using a range of AR platforms. AR platforms may normalize and generate the display as determined by the system. Illustrative AR platform architecture may include an application layer, a graphics layer, and a rendering layer. An AR input translation layer may manage interactions between the AR rendering engine and the various platforms.

The AR device may function as a node on an Internet of Things (IOT) network. An IOT may be defined as a pervasive and ubiquitous network that enables monitoring and control of the physical environment by collecting, processing, and analyzing the data generated by nodes (e.g., smart objects). The diverse nature and large volume of data collected by numerous interconnected nodes on an IoT enables unique functionality and operational opportunities.

Each IOT node may represent an IOT device. Each node may include two or more nodes. A node may include a sensor. Sensors may include devices that detect changes in a physical or virtual environment. Sensors may include cameras for capturing images of the environment. For example, one or more cameras may be embedded or partially embedded in smart glasses.

Sensors may be any suitable size. For example, sensors may be a few millimeters in size. Sensors may be deployed in a wide variety of locations. Sensors may be relatively inexpensive and have low energy consumption. Sensors may "sense" two or more stimuli or environmental changes.

Captured IoT device data may be transmitted using any suitable transmission method. Captured data may be transmitted by the sensor and processed away from the location of the sensor that captured the data. For example, captured data may be transmitted from one node to another node until the captured data reaches a data repository.

Captured IoT device data may be transmitted to a location where information is needed for decisioning or consumption, which may not be the same place the data was captured or generated. Data synchronization protocols and caching techniques may be deployed to ensure availability of information at, or delivery to, a desired node. Captured data may be stored locally on the sensor for an amount of time prior to transmission or broadcast to another node.

In some embodiments, sensor data may be transmitted continuously. In some embodiments, sensor data may be transmitted on a periodic schedule. In some embodiments, sensor data may be transmitted in response to a change in conditions detected by the sensor.

The sensor data may be processed using edge computing. Edge computing is a distributed, open IT architecture that features decentralized processing power. Data may be processed by a local computer or server rather than being transmitted to a data center, reducing internet bandwidth usage.

One or more non-transitory computer-readable media storing computer-executable instructions are provided. When executed by a processor on a computer system, the instructions perform a method for rendering and updating an integrated augmented environment in real time.

The method may include an AR device receiving a beacon device signal transmitting a location-related message and filtering the beacon device signal based on a user interest.

The method may include using natural language processing to extract content from the beacon device message. The method may include using machine learning to classify the message based on the extracted content and label the message based on the user interest.

The method may include pairing the beacon device with the AR device and inputting the labeled message to an AR rendering engine.

The method may include capturing a first view of a physical environment at the AR device and, using one or more deep learning algorithms, identifying objects in the physical environment. The method may include rendering an augmented environment comprising graphics and/or text integrated with the view of the physical environment.

The method may include capturing a second view of the physical environment at the AR device and identifying a change in position for the identified objects between the first view and the second view. The method may include adjusting the rendering based on the change in position for the identified objects.

Object recognition may involve a camera capturing an image of the physical environment. A feature extraction engine may use a GAN in combination with an RNN to identify objects in the physical environment. An event monitoring engine may use the deep learning algorithms to identify changes in the captured images. Based on output from the deep learning algorithms, a contextual analysis engine may determine spatial dimensions of the objects, relationships between objects, and any other suitable parameters of the environment.

The AR rendering engine may select graphics and/or text based at least in part on the labeled beacon feed and on input from the contextual analysis engine. The AR rendering engine may integrate the graphics and/or text into the AR display based on input from the contextual analysis engine.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative apparatus 100 that may be configured in accordance with the principles of the invention. FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database.

Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform the functions of one or more of extracting image features, identifying objects in the physical environment, identifying contextual relationships, parsing a beacon feed, rendering AR graphics and text, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
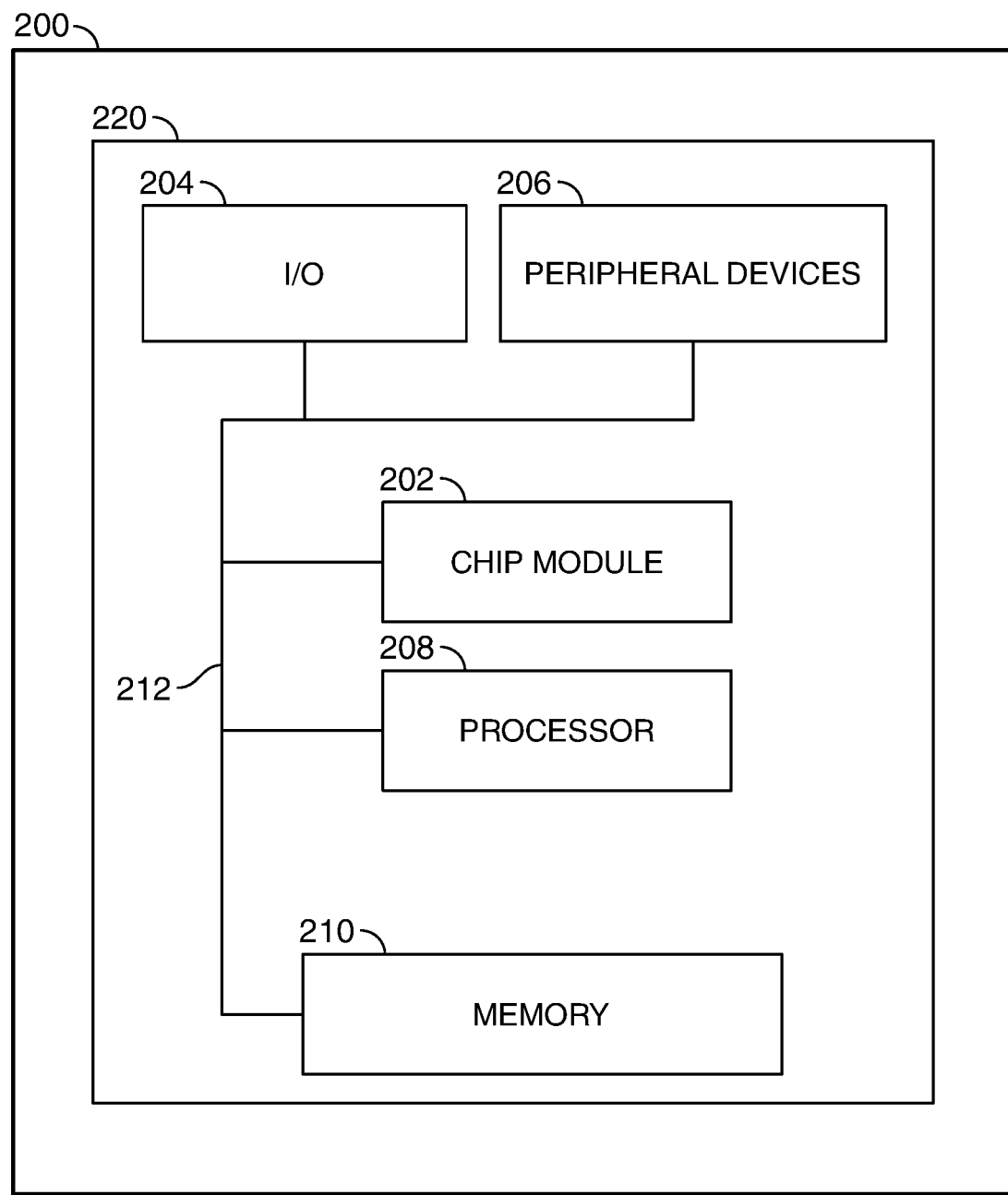
FIG. 2 shows illustrative apparatus in accordance with principles of the disclosure.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may extract image features, identify objects in the physical environment, identify contextual relationships, parse beacon feeds, render AR graphics and text, and perform other methods described herein; and machine-readable memory 210.

Machine-readable memory 210 may be configured to store in machine-readable data structures: images of the physical environment, identified objects, relationships between objects, beacon feeds, user preferences, classified and labeled beacon messages, rendered graphics and text, and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
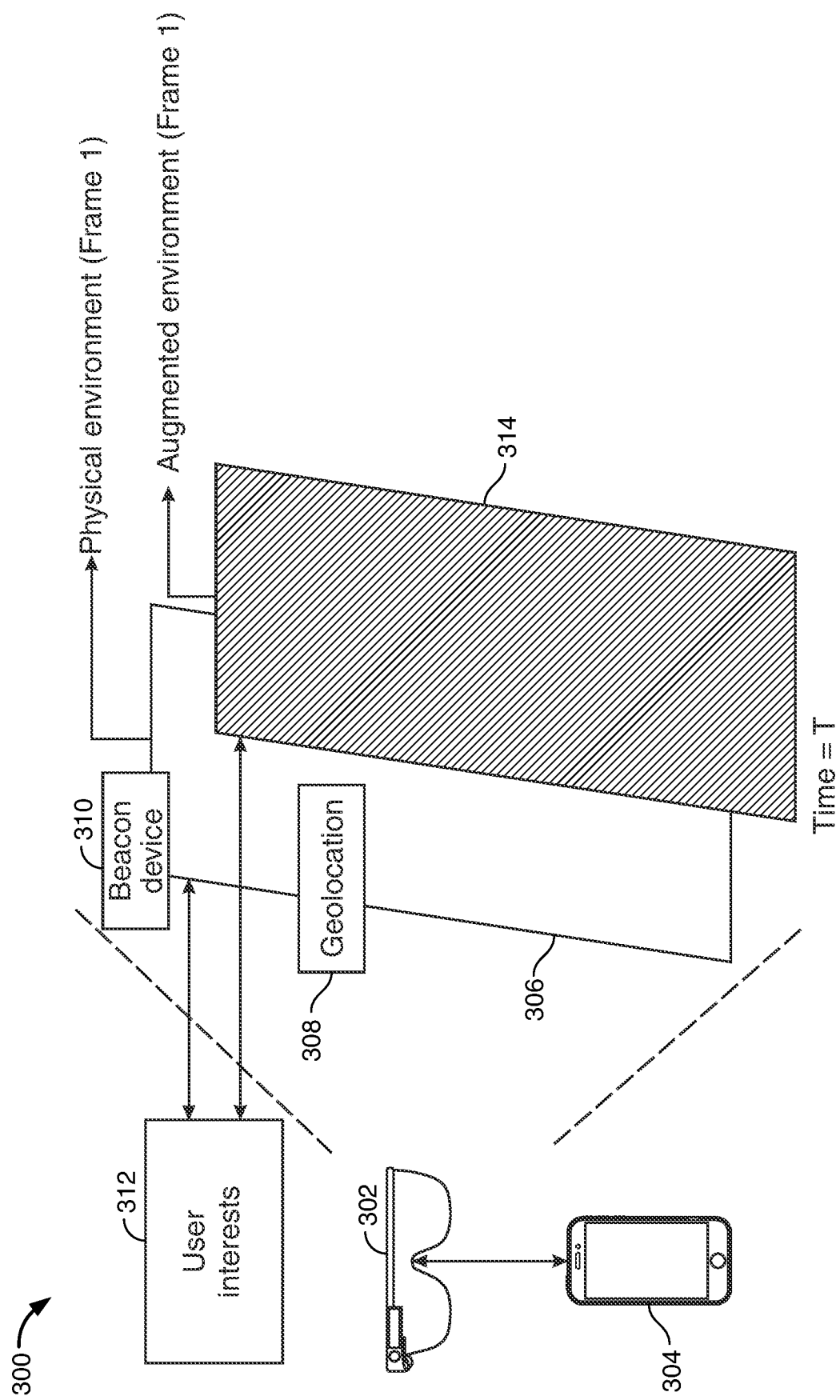
FIG. 3 shows an illustrative process flow in accordance with principles of the disclosure.

FIG. 3 shows high-level system overview 300. A user may view the physical environment though AR device 302. AR device 302 may be a smart glasses device. AR device 302 may be in communication with mobile device 304. In some embodiments, the user may view the augmented environment on mobile device 304.

Frame 306 may include a captured view of the physical environment at time T. Supplemental information about the physical environment may be provided through geolocation 308 and/or beacon device 310.

Frame 314 may include an augmented view of the environment at time T. The system may detect and identify physical objects in frame 306 using deep learning algorithms. The system may extract spatial and temporal properties of the physical environment. The system may determine user interests 312. The system may identify a feed from beacon 310 and parse the beacon feed to an AR rendering engine. The AR rendering engine may generate frame 314. Frame 314 may display an augmented view of the environment that is rendered to include graphics and/or text generated by the AR rendering engine.

Figure 4:
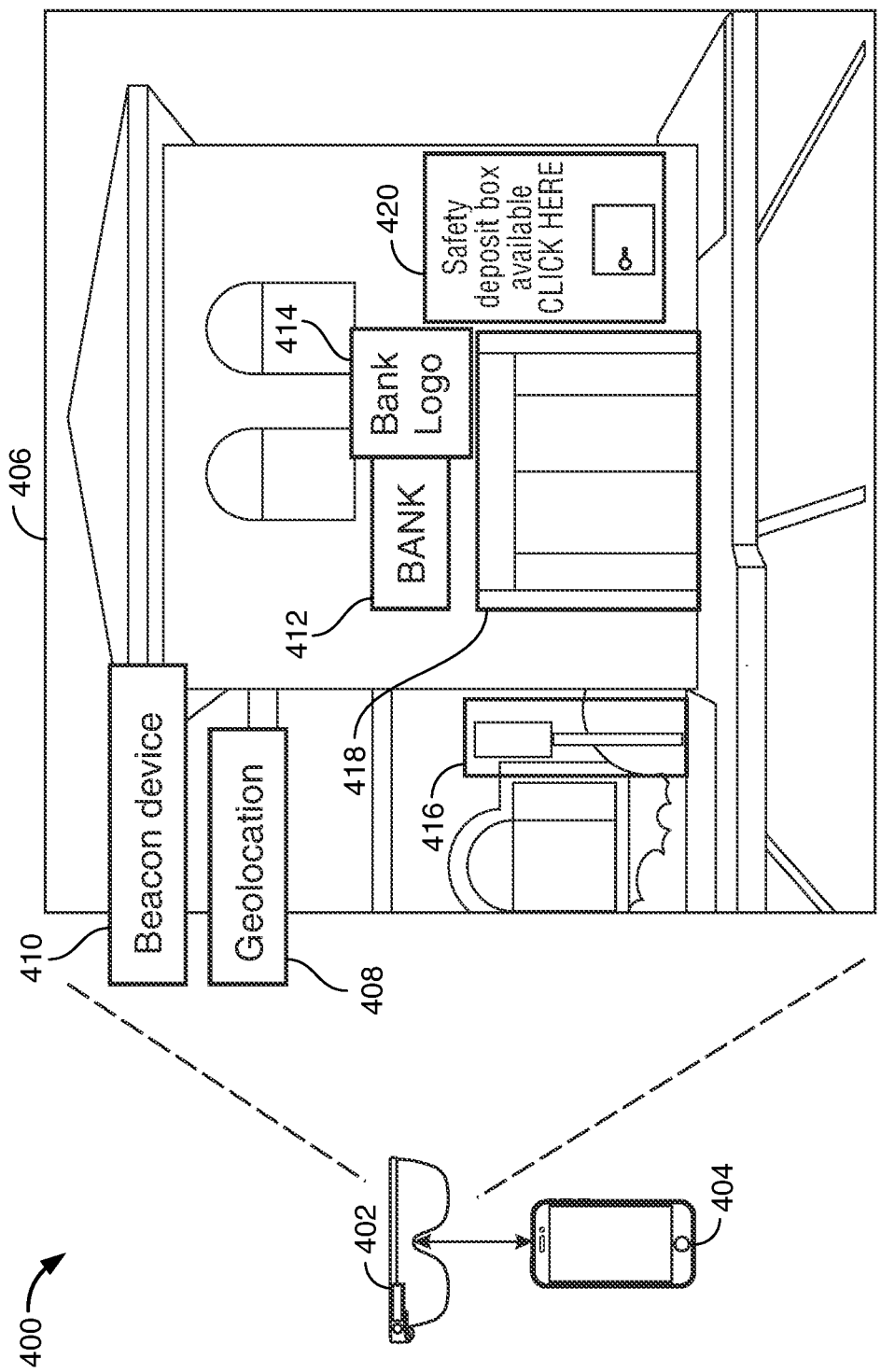
FIG. 4 shows an illustrative scenario in accordance with principles of the disclosure.

FIG. 4 shows illustrative scenario 400. Scenario 400 may include an AR view through AR device 402. One or more elements of scene 400 may overlap with elements of system overview 300, shown in FIG. 3.

A user may view augmented environment 406 at AR device 402. AR device 402 may be in communication with mobile device 404.

The illustrative environment shown in view 406 is a banking center. Physical environment parameters may be obtained from an image captured by AR device 402. Supplemental information about the physical environment may be obtained from geolocation 408 and beacon device 410.

View 406 may include rendered object 420. Rendered object 420 may be integrated into the physical environment. The illustrative rendered object shown is a safety deposit box.

Deep learning algorithms may identify objects in the captured image. Identified objects may include banking center name 412 and banking center logo 414. This information about the physical environment, in combination with the feed from beacon 410 and user preferences, may determine the content of rendered object 420.

Identified objects may include parking sign 416 and doors 418. Placement of the rendered object may be based on the spatial relationships between the identified objects. In view 406, rendered object 420 may be placed on a blank section of the exterior wall rather than over a door or window.

Figure 5:
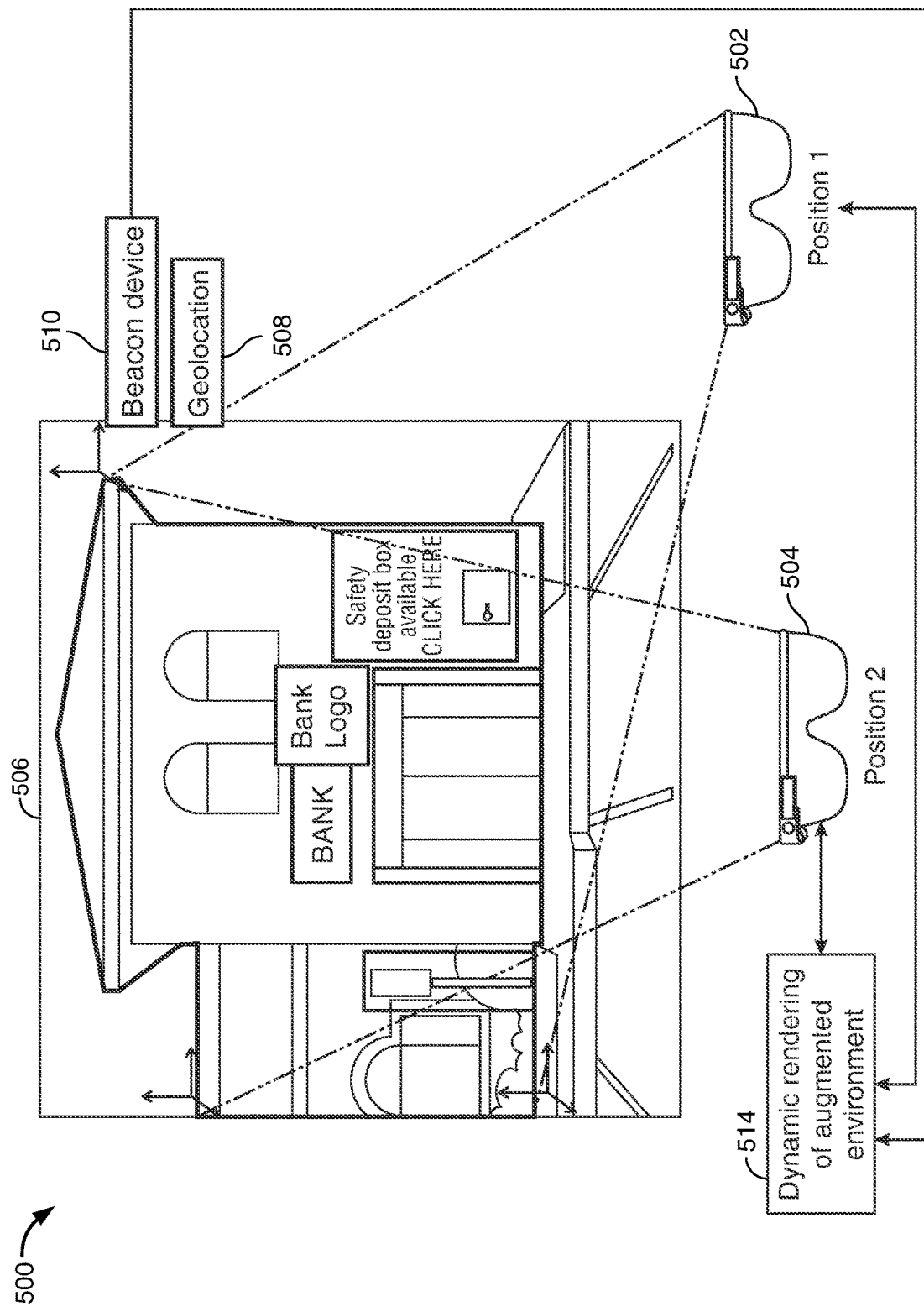
FIG. 5 shows an illustrative scenario in accordance with principles of the disclosure.

FIG. 5 shows illustrative scenario 500. Scenario 500 shows engagement with a physical environment. One or more elements of scenario 500 may overlap with elements of scenario 400, shown in FIG. 4, and/or system overview 300, shown in FIG. 3.

Illustrative view 506 shows a banking center. Information about the physical environment may be obtained through images captured by smart glasses at position 502 and position 504. Information about the physical environment may be obtained from geolocation 508 and beacon device 510.

Deep learning algorithms may identify objects in the captured image. Identified objects may include the banking center name, banking center logo and an outline of the building. This information about the physical environment, in combination with the feed from beacon 510 and user preferences, may determine the content of a rendered object.

The system may receive a first captured image from AR device at position 502 at time T and at 514 may render a first augmented environment view. The system may receive a second captured image from the smart glasses at position 504 at time T−1. At 514, the system may render a second augmented view of the environment that is adjusted for changes in user position. Placement of rendered graphics or text may be adjusted in the second view.

Figure 6:
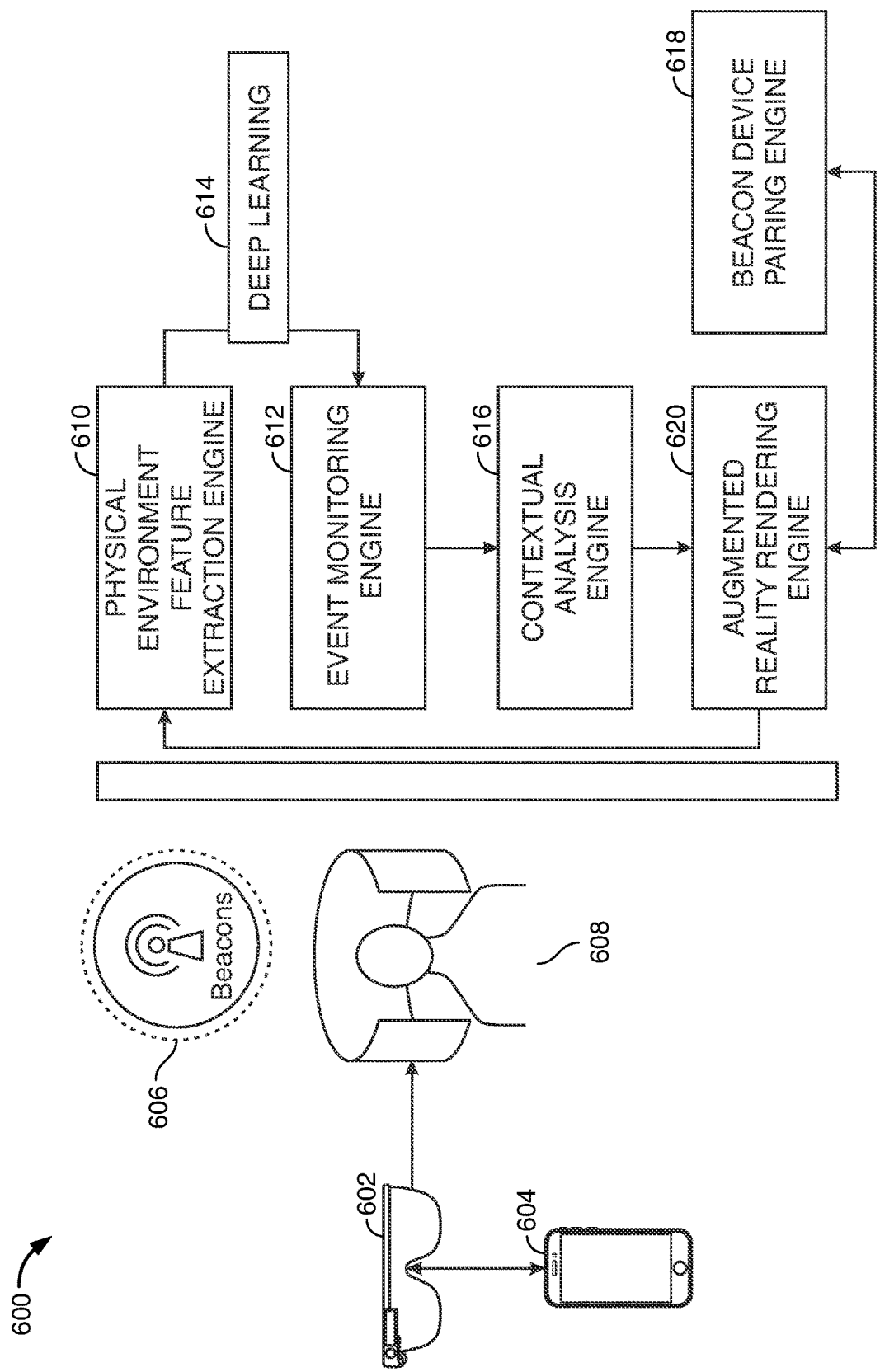
FIG. 6 shows an illustrative process flow in accordance with principles of the disclosure.

FIG. 6 shows illustrative process flow 600. Process flow 600 shows integration of rendered objects with the physical environment. Elements 602-608 show the user experience.

AR device 602 may capture a view of the physical environment. AR device 602 may be in communication with mobile device 604. Supplemental information about the physical environment may be received from beacons 606. The system may generate augmented view 608 which may be displayed on AR device 602 or mobile device 604.

Elements 610-620 show processing of the captured physical environment data. Physical environment feature extraction engine 610 may identify objects in the image captured by AR device 602. Engine 610 may be in communication with deep learning algorithms 614. Deep learning algorithms 614 may include GANs, RNNs, NLPs, and/or any suitable algorithms. Event monitoring engine 612 may determine changes in the physical environment based on a sequence of captured images. For example, changes may be caused by a shift in user position or by movement of objects in the physical environment. Engine 612 may be in communication with deep learning algorithms 614.

Contextual analysis engine 616 may identify spatial relationships within the physical environment. The engine may identify temporal changes in the environment. The engine may identify other parameters of the environment, such as climate or crowds. Contextual relationships may be transmitted to AR rendering engine 620.

Beacon device pairing engine 618 may parse a feed from beacon 606 and transmit classified and labeled beacon messages to AR rendering engine 620. AR rendering engine may render the augmented environment view shown at 608. The AR rendering engine may provide feedback to the feature extraction engine. The AR rendering engine may provide feedback to the beacon device pairing engine.

Figure 7:
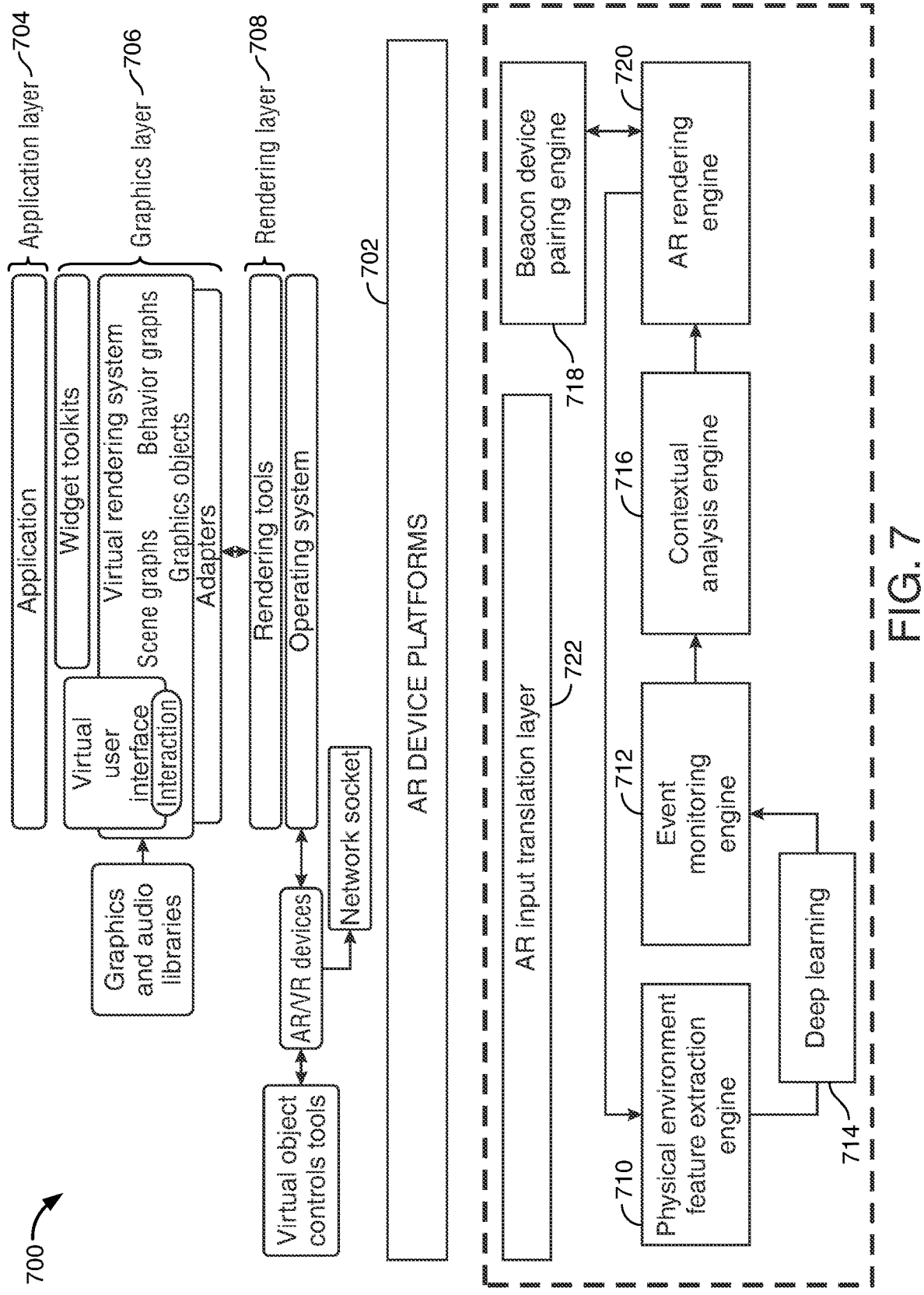
FIG. 7 shows an illustrative process flow in accordance with principles of the disclosure.

FIG. 7 shows illustrative process flow 700. Process flow 700 shows integration of the system with other AR platform elements. The system may include steps 710-718 for rendering an AR display based on input from the physical environment and from the beacon feed. Steps 710-720 may correspond to steps 610-620 shown in FIG. 6.

AR input translation layer 722 may interface between the system and AR device platforms 702. The system may be compatible with a wide range of device platforms. The AR device platform may involve a cloud-based infrastructure.

The cloud-based infrastructure may include application layer 704. AR device platforms may include graphics layer 706. Graphics layer 706 may access graphics and audio libraries. Illustrative libraries include ARToolKit and OpenAL™. ARToolKit is an open-source computer tracking library for creation of augmented reality. OpenAL™, owned by Creative Technologies Ltd., is a cross-platform audio API for efficient rendering of multichannel three-dimensional positional audio. These libraries may interact with a virtual rendering system. Illustrative virtual rendering systems include Canvas™, owned by Occipital, Inc. The virtual rendering system may include components such as scene graphs and graphic objects.

Graphics layer 706 may include various adapters for rendering tools. Rendering layer 708 may include a set of rendering tools. Illustrative rendering software includes OpenGL, RenderMan™, POV-Ray, and Radiance. OpenGL is an open-source, cross-platform API for rendering 2D and 3D vector graphics. RenderMan™, owned by Pixar, is a tool for rendering visual effects and animation. POV-Ray is a cross-platform ray-tracing program that generates images from a text-based scene description. Radiance is a suite of tools for performing lighting simulation and includes a renderer as well as other tools for measuring the simulated light levels.

Layers 704-708 may interact with operating systems on AR/VR devices. The AR/VR devices may include virtual object control tools such as PinchGlove™ or SpaceMouse™.

Figure 8:
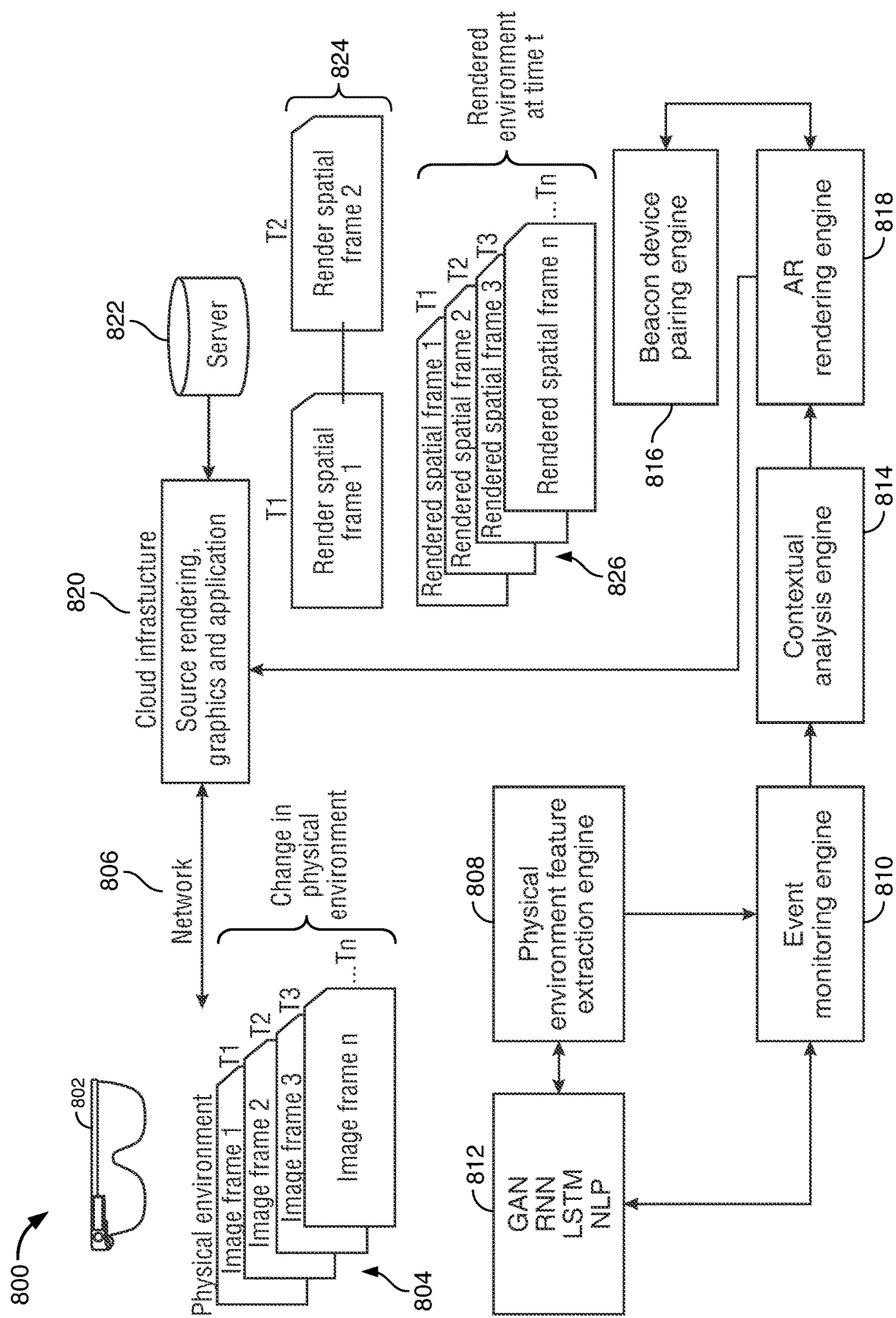
FIG. 8 shows an illustrative process flow in accordance with principles of the disclosure.

FIG. 8 shows illustrative process flow 800. Process flow 800 shows a technical overview that incorporates AR device processing as well as processing via cloud-infrastructure. Elements 802 through 818 may be associated with the AR device. Elements 820-826 may be associated with cloud infrastructure.

At step 802 an AR device such as smart glasses may capture frames 804. Frames 804 may be images of the physical environment at a series of timestamps. At steps 808-818, the system may extract physical environment data for input to the AR rendering engine. Steps 808-818 may correspond to steps 610-620 in FIG. 6 and steps 710-720 in FIG. 7.

The AR engine may interact with cloud-based infrastructure 820. Cloud-based infrastructure 820 may include the application, graphics and rendering layers shown in elements 704-708 in FIG. 7. Cloud-based infrastructure 820 may be in communication with server 822. Baseline spatial frames 824 may be rendered for each image frame 804 captured in the physical environment. Spatial frames 826 may render newly generated graphics and text with the baseline frames.

Cloud-based infrastructure 820 may interact with AR device 802 via network 806. Network 806 may be a 5G or 6G network to increase processing speeds and reduce latency.

AR rendering may occur at the AR rendering engine on the AR device. AR rendering may occur wholly or partially at an edge device on the local network. The AR device may be configured to scan the network for devices with rendering capabilities. Rendering may also occur wholly or partially at cloud-based AR platforms. The processing load for real-time rendering may be distributed among any combination of local and remote locations. Distribution may shift based on device capabilities, network capabilities, AR platform resources, or based on any suitable factors.

Figure 9:
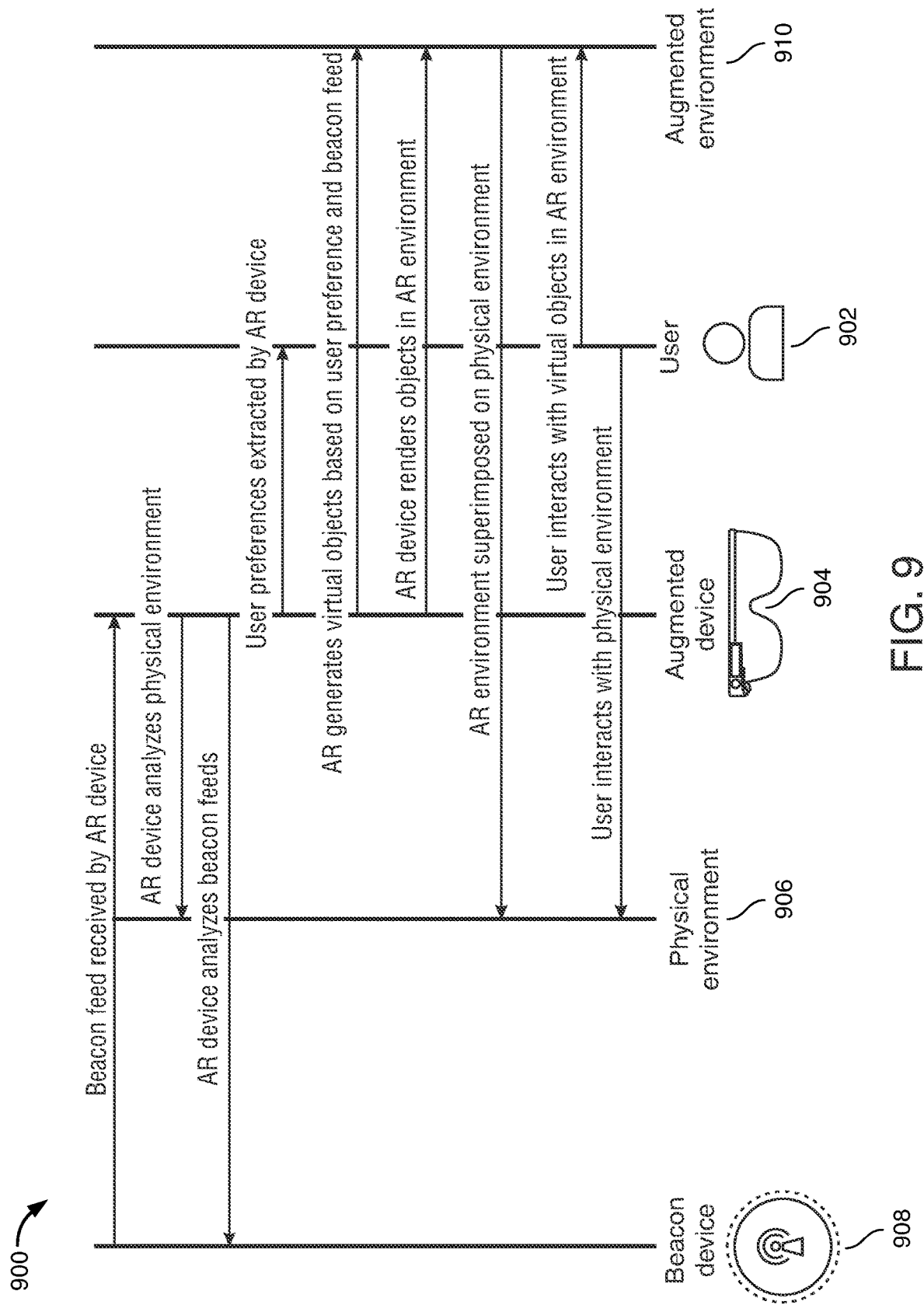
FIG. 9 shows an illustrative process flow in accordance with principles of the disclosure.

FIG. 9 shows illustrative process flow 900. Process flow 900 shows a flow of information between user 902, AR device 904, physical environment 906, beacon device 908, and augmented environment 910.

Figure 10:
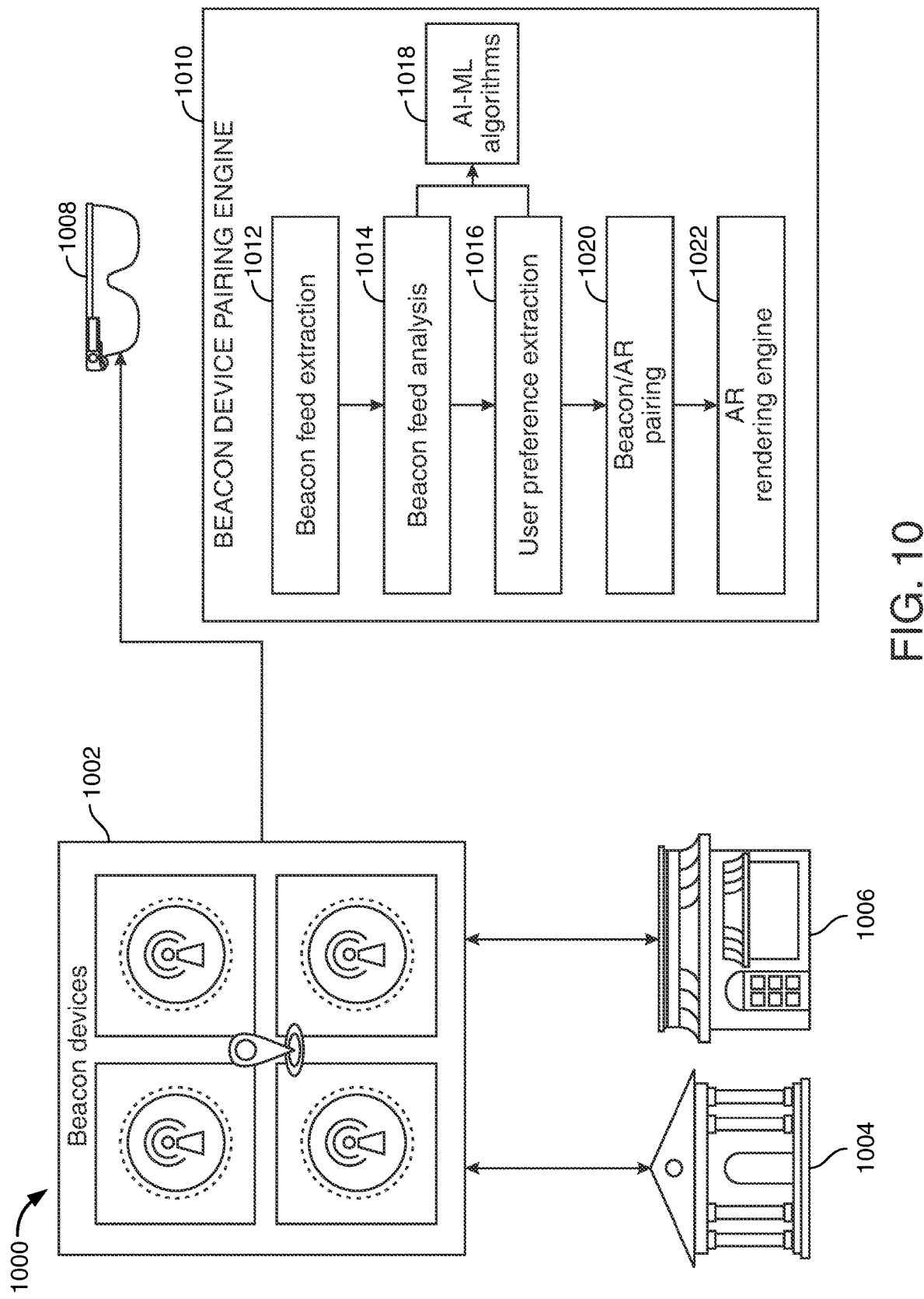
FIG. 10 shows an illustrative process flow in accordance with principles of the disclosure.

FIG. 10 shows illustrative process flow 1000. Process flow 1000 shows integration of a beacon device with an AR device. Beacon devices 1002 may use BLE or any suitable method to broadcast messages from enterprises such as bank 1004 and retail store 1006. A beacon message may be received at AR device 1008.

Beacon device pairing engine 1010 may parse the beacon feed. At step 1012, the beacon feed may be extracted. At step 1014, the beacon feed may be analyzed using machine learning algorithms 1018 such as NLP. At step 1016, user preferences may be extracted from user browsing data or from any suitable source. The processed beacon feed may be labeled and classified based on user preferences using machine learning algorithms 1018. At step 1020 the labeled and classified beacon feed may be formatted for input to the AR rendering engine.

Thus, methods and apparatus for INTELLIGENT DYNAMIC RENDERING OF AN AUGMENTED REALITY ENVIRONMENT are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for integrating an augmented reality overlay with a view of a physical environment using deep learning, the method comprising an augmented reality device:

receiving a beacon signal transmitting a text-based offer message;

filtering the beacon signal based on a user interest;
capturing a view of a physical environment;
using one or more deep learning algorithms, identifying one or more objects in the physical environment; and
rendering an augmented reality overlay comprising graphics and/or text, the overlay content based on the beacon signal and the user interest, and the overlay position based on the identified objects;
wherein the filtering comprises:
   using natural language processing, extracting content from the beacon message;
   using machine learning:
      classifying the beacon message based on the content of the message; and
      labeling the beacon message based on the user interest;
   pairing the beacon and the augmented reality device; and
   inputting the labeled message to a rendering engine; and
wherein the method further comprises the augmented reality device:
   capturing a series of image frames from a single user vantage point at a series of timestamps, the image frames comprising a first image frame at a first timestamp and a second image frame at a second timestamp;
   generating a baseline spatial frame from the first image;
at an event monitoring engine, detecting a shift between the first image frame captured from a first user vantage point at the first timestamp and the second image frame captured from a different user vantage point at the second timestamp, the detecting comprising:
   triggering deep learning algorithms comprising a generative adversarial network (GAN) and a recurrent neural network (RNN) based at least in part on a difference between the first image frame captured from the single user vantage point at the first timestamp and the second image frame captured from the single user vantage point at the second timestamp; and
   at the GAN and the RNN, extracting an image feature comprising an object in the first image frame captured from the user vantage point at the first timestamp and an image feature comprising the object in the second image frame captured from the user vantage point at the second timestamp; and
based on output from the GAN and the RNN:
   rendering a new object in the baseline spatial frame; and
   modifying the overlay position based on the new object.

2. The method of claim 1, wherein the beacon is a Bluetooth™ low energy device.

3. The method of claim 1, further comprising aligning the overlay with respect to the identified objects based on a set of placement rules.

4. The method of claim 1, wherein identifying an object further comprises:
a camera capturing an image of the physical environment;
a feature extraction engine, using a generative adversarial network in combination with a recurrent neural network, identifying one or more objects in the physical environment; and
a contextual analysis engine measuring:
   a spatial dimension of an identified object; and
   one or more parameters associated with the physical environment.

5. The method of claim 1, further comprising providing feedback to the deep learning algorithms based on the rendering.

6. The method of claim 1, wherein appearance of the rendered overlay is based, at least in part, on appearance of an identified object.

7. One or more non-transitory computer-readable media storing computer-executable instructions which, when executed by a processor on a computer system, perform a method for rendering an integrated augmented environment, the method comprising an augmented reality device:
receiving a beacon device signal transmitting a location-related message text;
filtering the beacon device signal based on a user interest;
capturing a view of a physical environment;
using one or more deep learning algorithms, identifying an object in the physical environment; and
rendering an augmented environment comprising graphics and/or text integrated with the view of the physical environment, wherein content of the graphics and/or text is based at least in part on the beacon signal and the user interest, and the position of the graphics and/or text in the augmented environment is based at least in part on the identified object;
wherein the filtering comprises:
   using natural language processing, extracting content from the beacon device message;
   using machine learning:
      classifying the beacon device message based on the extracted content; and
      labeling the beacon message based on the user interest;
   pairing the beacon device and the augmented reality device; and
   inputting the labeled message to an augmented reality rendering engine; and
wherein the method further comprises the augmented reality device:
   capturing a series of images from a single user position at a series of timestamps, the image frames comprising a first image frame at a first timestamp and a second image frame at a second timestamp;
   generating a baseline spatial frame from the first image frame;
   at an event monitoring engine, detecting a shift between the image frame captured from a first user vantage point at the first timestamp and the image frame captured from a different user vantage point at the second timestamp, the detecting comprising:
      triggering deep learning algorithms comprising a generative adversarial network (GAN) and a recurrent neural network (RNN), based at least in part on a difference between the first image frame captured from the single user position at the first timestamp and the second image frame captured from the single user position at the second timestamp; and
      at the GAN and the RNN, extracting an image feature comprising an object in the first image frame captured from the single user position at the first timestamp and an image feature comprising the object in the second image frame captured from the single user position at the second timestamp; and
   based on output from the GAN and the RNN:

rendering a new object in the baseline spatial frame; and modifying the overlay position based on the new object.

8. The media of claim 7, wherein identifying an object further comprises:
a camera capturing an image of the physical environment;
a feature extraction engine, using a generative adversarial network in combination with a recurrent neural network, identifying one or more objects in the physical environment; and
a contextual analysis engine measuring:
a spatial dimension of an identified object; and
one or more parameters associated with the physical environment.

9. The media of claim 7, wherein the rendered graphics and/or text comprise a hyperlink to a product or service.

10. A system for rendering an integrated augmented environment, the system comprising:
an augmented reality device configured to:
receive a beacon device signal transmitting a location-related message;
filter the beacon device signal based on a user interest;
capture a view of a physical environment;
using one or more deep learning algorithms, identify an object in the physical environment; and
render an augmented environment comprising a graphic image integrated with the view of the physical environment, wherein selection of the graphic image is based at least in part on the beacon signal and the user interest, and placement of the graphic image in the augmented environment is based at least in part on the identified object;
wherein filtering the beacon device signal comprises:
using natural language processing, extract content from the beacon device message;
using one or more machine learning algorithms:
classifying the beacon device message based on the extracted content; and
labeling the beacon message based on the user interest;
pairing the beacon device and the augmented reality device; and
inputting the labeled message to an augmented reality rendering engine; and
wherein the augmented reality device is further configured to:
capture a series of image frames from a single user vantage point at a series of timestamps, the image frames comprising a first image frame at a first timestamp and a second image frame at a second timestamp;
generate a baseline spatial frame from the first image;
at an event monitoring engine, detect a shift between the first image frame captured from a first user vantage point at the first timestamp and the second image frame captured from a different user vantage point at the second timestamp, the detecting comprising:
triggering deep learning algorithms comprising a generative adversarial network (GAN) and a recurrent neural network (RNN), based on the shift between the first image frame captured from the single user vantage point at the first timestamp and the second image frame captured from the single user vantage point at the second timestamp; and
at the GAN and the RNN, extract an image feature comprising an object in the first image frame captured from the single user vantage point at the first timestamp and an image feature comprising an object in the second image frame captured from the single user vantage point at the second timestamp;
based on output from the GAN and the RNN:
render a new object in the baseline spatial frame; and
modify the overlay position based on the new object.

11. The system of claim 10, wherein identifying an object further comprises:
a camera capturing an image of the physical environment;
a feature extraction engine, using a generative adversarial network in combination with a recurrent neural network, identifying one or more objects in the physical environment; and
a contextual analysis engine measuring:
a spatial dimension of an identified object; and
one or more parameters associated with the physical environment.

12. The system of claim 10, wherein the graphic image comprises a hyperlink to a product or service.

13. The system of claim 10, the AR device comprising an input layer configured to interface with a cloud-based AR platform comprising an application layer, a graphics layer, and a rendering layer.

* * * * *